United States Patent [19]

Arnett

[11] Patent Number: 5,096,439
[45] Date of Patent: Mar. 17, 1992

[54] WALL PLATE HAVING JACK-RELEASE SLOTS

[75] Inventor: Jaime R. Arnett, Noblesville, Ind.

[73] Assignee: AT&T Bell Laboratories, Murray Hill, N.J.

[21] Appl. No.: 751,037

[22] Filed: Aug. 28, 1991

[51] Int. Cl.⁵ .......................................... H01R 13/74
[52] U.S. Cl. ...................................... 439/536; 174/66
[58] Field of Search .............................. 439/536-538; 174/66, 153 G; 220/241

[56] References Cited

U.S. PATENT DOCUMENTS

| | | | |
|---|---|---|---|
| 4,261,633 | 4/1981 | Abernethy | 339/97 |
| 4,451,106 | 5/1984 | Wisehart et al. | 339/123 |
| 4,477,141 | 10/1984 | Hardesty | 339/122 |
| 4,494,815 | 1/1985 | Brzostek et al. | 439/536 |
| 4,859,201 | 8/1989 | Marsh | 439/290 |
| 5,041,018 | 8/1991 | Arnett | 439/536 |

FOREIGN PATENT DOCUMENTS 2194395 3/1988 United Kingdom ............... 174/66

Primary Examiner—Gary F. Paumen
Attorney, Agent, or Firm—Michael A. Morra

[57] ABSTRACT

A wall plate comprises a generally flat surface having an opening therein, extending between its front and back sides, for receiving a communications jack. The back side of the wall plate includes apparatus for engaging the jack and holding it together with the wall plate. A pair of slots are positioned on opposite sides of the opening which provide access, from the front side of the wall plate, to the jack engaging apparatus so that the jack can be easily removed from the wall plate. The slots comprise grooves within a pair of sidewalls that are positioned on opposite sides of the opening. Each groove extends from the front surface of the wall plate toward the back surface thereof, but terminates in a ledge before reaching the back edge of the sidewall. The sidewalls are connected by top and bottom walls and, together, form a collar around the back side of the wall plate.

10 Claims, 4 Drawing Sheets

WALL PLATE HAVING JACK-RELEASE SLOTS

TECHNICAL FIELD

This invention relates to electrical communication outlets, and more particularly to wall plates used to support such equipment.

BACKGROUND OF THE INVENTION

In the field of communications, several standardized intefaces have been adopted for establishing electrical connections to communication lines. One such interface is the miniature jack, referred to as a modular jack, that has been adopted by the U.S. Federal Communications Commission as the standard connector for connecting telephone equipment to telephone lines. This jack, however, comes in different versions depending on the number of electrical contacts desired—four, six or eight. Additionally, connectors exist, for equipment other than telephone sets, that share the same location at a customer premises but do not share the same interface standard. Although a proliferation of connectors exists, it is desirable to provide a common housing that will accommodate various connectors. A convenient housing is a wall plate, but existing plate designs have a number of drawbacks which are briefly discussed.

U.S. Pat. No. 4,261,633 is illustrative of the situation in which a jack frame is molded into the wall plate itself. While it is an advantage that the wall plate has a jack that is flush with its front surface, such apparatus suffers the disadvantage that a different wall plate is needed for each different jack. For example, within the class of modular telephone jacks it is possible to insert a six-contact plug into an eight-contact jack, but undesirable because users will think that they are making the wrong connection. Thus, different wall plates would be needed to handle jacks that are only slightly different. Furthermore, from a reliability standpoint, it is undesirable to trust customers, or even repair-persons, to insert a spring block into the back side of a jack frame because the proper alignment of its closely spaced spring contacts is critical. (Note that if the jack frame is part of the wall plate, then the spring block with its associated spring contacts must be field installed rather than factory installed).

U.S. Pat. No. 4,859,201 is illustrative of wall plates that accommodate a number of jack outlets which can only be removed from the back side of the wall plate. Although this patent only shows two jacks mounted on the wall plate, it would be very difficult to reach and deflect the flexible tabs that interlock the jack and wall plate together—particularly if a number of wires were connected to each jack. Although the flexible tabs are located on the modular jack in this patent, the problem of easy removal from the wall plate is not improved by molding the flexible tabs into the back of the wall plate itself. This is demonstrated in U.S. Pat. No. 4,477,141 where access to the tabs is no better than the '201 patent.

It is desirable to be able to mount a number of communications jacks on a single wall plate and still be able to easily remove any one of them. None of the above patents offers a satisfactory solution to the problem of releasing jacks from their associated wall plate in a convenient manner.

SUMMARY OF THE INVENTION

A wall plate, which substantially overcomes the aforementioned disadvantages, comprises a generally flat surface having an opening therein, extending between its front and back sides, for receiving a communications jack. The back side of the wall plate includes means for retaining the jack and wall plate together. A pair of slots are positioned on opposite sides of the opening that extend from the front surface of the wall plate to the jack retaining means. Access to the jack retaining means from the front surface of a wall plate allows communications jacks to be conveniently released.

In a first illustrative embodiment of the invention, the slots comprise grooves within a pair of sidewalls that are positioned on opposite sides of the opening. Each groove extends from the front surface of the wall plate toward the back surface thereof, but terminates in a ledge before reaching the back edge of the sidewall. The sidewalls are connected by top and bottom walls and, together, form a collar around the opening in wall plate on its back side.

In a second illustrative embodiment of the invention, the jack retaining means comprises a pair of flexible, cantilevered tabs that are positioned on opposite sides of the opening in the wall plate on its back side. Each tab includes a hook that mates with a complementary indentation on a jack to hold the jack and wall plate together. The tabs are positioned adjacent to the slots, and are tapered slightly toward each other to provide a contact surface for a jack-removing tool to interact with when pressed into the slots.

DETAILED DESCRIPTION

Electrical interconnection between communication equipment and premises wiring is facilitated by standardized connectors that are frequently referred to as modular plugs and jacks. Specifications for such plugs and jacks can be found in Subpart F of the FCC Part 68.500 Registration Rules. Because modular jacks are lightweight and do not convey commercial power to communication equipment, it is safe and convenient to mount them directly onto a wall plate (sometimes also called a face plate or a coverplate). However, communications wall plates have not been designed to accommodate those users who need to frequently release the jack from the wall plate, either because of equipment rearrangements, or because of the servicing needs associated with large communications installations. Additionally, do-it-yourself customers, who install their own wiring, appreciate the convenience of easily released jacks because wiring connections are seldom done correctly the first time. Finally, for aesthetic and other reasons, the ability to flush-mount communications jacks is desirable.

Figure 1:
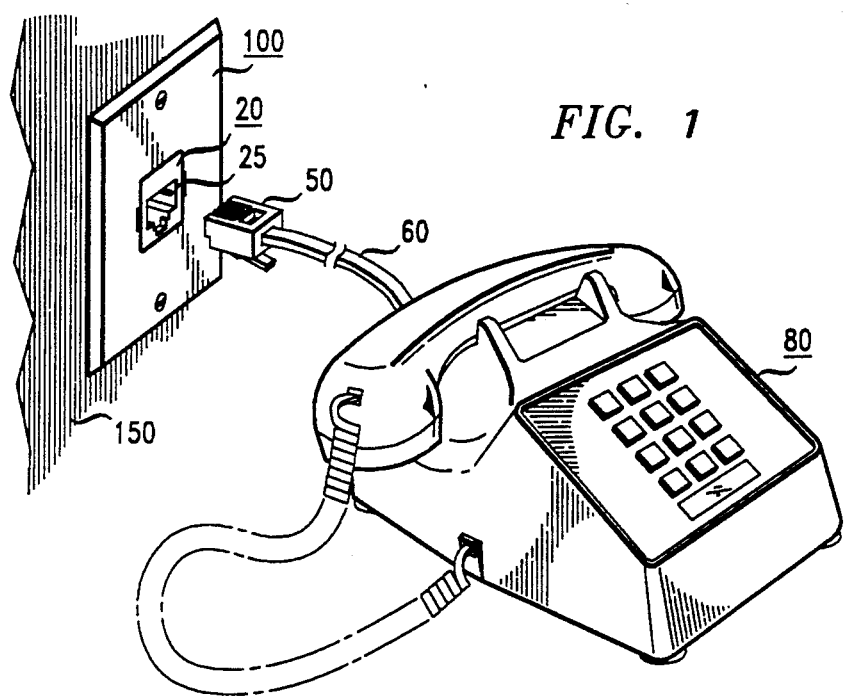
FIG. 1 discloses a communications outlet including a modular jack such as used by telecommunications equipment.

Modular plugs and jacks provide a convenient means for connecting and disconnecting telephone equipment such as shown in FIG. 1. In this figure, a communication outlet, comprising a wall plate 100 and a communications jack 20 is shown mounted on wall surface 150. A conventional telephone set 80 is shown equipped with a cord 60 that is terminated in a modular plug 50. The modular plug is adapted to be inserted into cavity 25 of jack 20 which is frequently referred to as a modular jack. Jack 20 typically includes 4 contacts; although as few as 2, or as many as 8 contacts are not uncommon. Nevertheless, as home and business communication needs increase, so too will the number of outlets that service this need. Unlike AC power receptacles, communication receptacles are low voltage, low power devices that present little safety threat. Indeed, modular jacks need not be firmly mounted to a wall box before a wall plate is attached, but may be mounted directly onto the wall plate itself without more. A variety of wall plates are available for connecting insulated wires to a modular jack including the prior art apparatus shown in FIG. 7 and 8.

Prior Art

Figure 7:
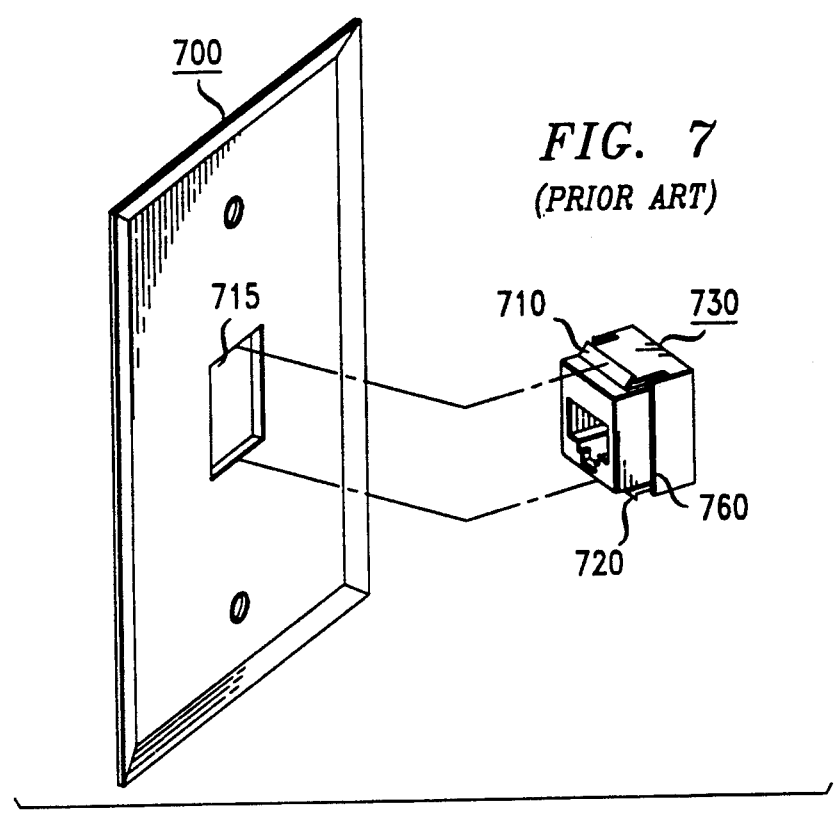
FIG. 7 discloses a first prior art wall plate and a modular jack designed with latching tabs on its top and bottom surfaces.

One prior art device is disclosed in FIG. 7 which shows a jack frame 730 that includes latching structures 710, 720. These structures are molded into the jack frame itself and are designed to snap into an opening 715 in wall plate 700, while retaining wall 760 stops the forward progression of jack 730 through the opening in the wall plate. Although this design offers a desirable quick-connect feature, the latching structures protrude through the opening in the wall plate and preclude a flush appearance. Further, even if a collar were molded into the back side of the wall plate, around opening 715, that included means for interlocking with latching structures 710, 720 (see e.g. U.S. Pat. No. 4,859,201), removal of the jack would be different in situations where one jack is positioned above another on the same wall plate. This difficulty stems from the inability to easily reach and deflect latching structures 710, 720.

Figure 8:
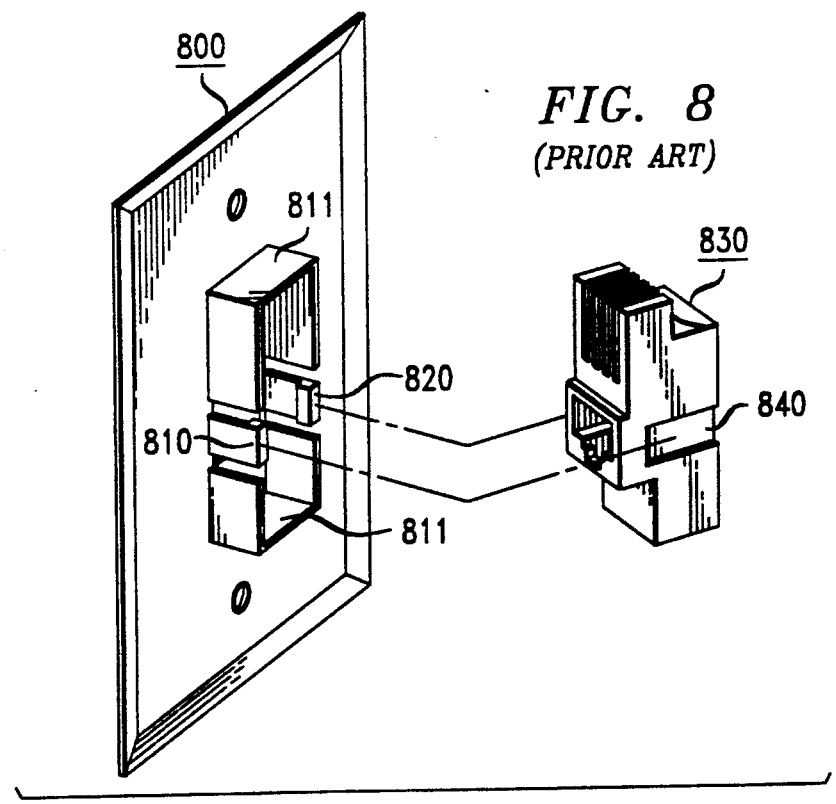
FIG. 8 discloses a second prior art wall plate having a jack-receiving collar and a modular jack.

Another prior art device is shown in FIG. 8 and disclosed in greater detail in U.S. Pat. No. 4,477,141. In this patent, a collar 811 is molded into the back side of wall plate 800 around an opening that receives the forward-projecting portion of jack frame 830. Latching structures 810, 820 are molded into wall plate 800 and cooperate with mating indentations 840 on jack 830 to hold the jack and wall plate together. While this design provides the ability to flush-mount a modular jack, removal of the jack is complicated when several jacks share a common wall plate because deflecting of latching structures 810, 820 must be done from the back side of the wall plate where wires and other jack frames may be in the way.

Wall plate with jack-release slots

Figure 2:
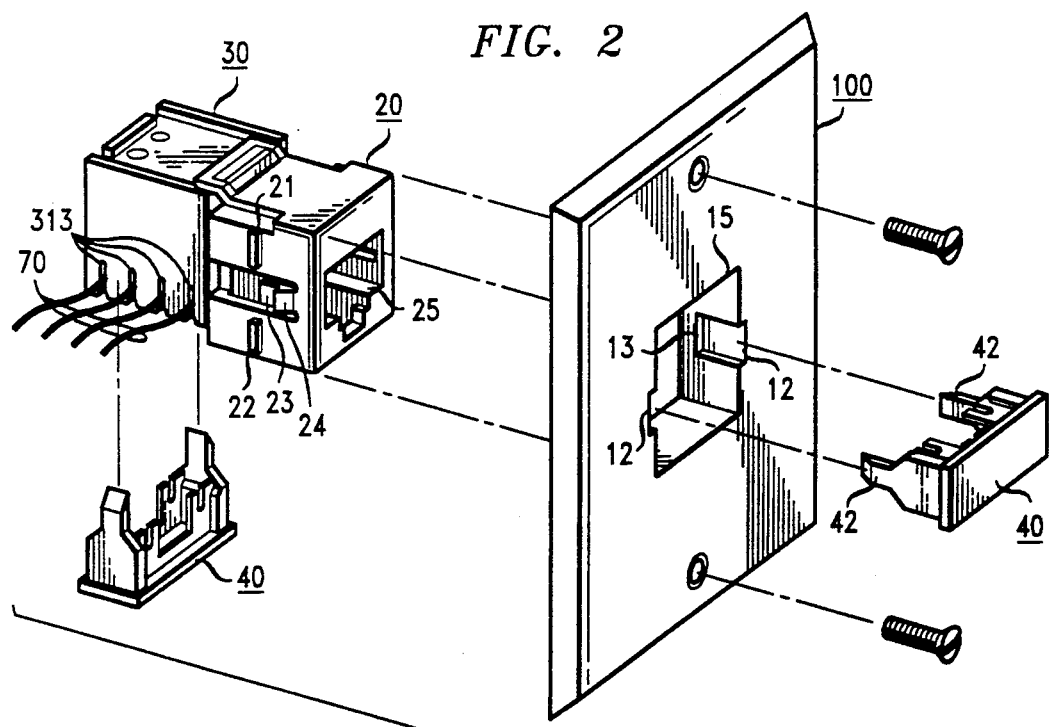
FIG. 2 illustrates the functional interaction between a wall plate made in accordance with the invention, a communications jack, and a jack release tool.

FIG. 2 generally illustrates the cooperation between the various parts of a communications outlet. Wiring 70, associated with communications equipment, terminates in an assembly comprising jack frame 20 and electrical connector 30. The electrical connector includes a metallic lead frame that is "sandwiched" between a dielectric spring block and a dielectric cover. In this illustrative embodiment, the lead frame comprises eight flat, elongated conductors that are each terminated at one end in a spring contact and at the other end in an insulation-displacing connector. Four of the insulating-displacing connectors are folded around each of two opposite side surfaces of the spring block to facilitate electrical connection to wires 70, while the spring contacts are wrapped around a front surface thereof. The front surface of the spring block is inserted into an opening in the back side of jack frame 20 and is designed to facilitate electrical contact between the spring contacts and the wires of modular plug 50 (see FIG. 1) inserted into cavity 25 in the front side of the jack frame. Wires 70 are pressed into wire-receiving slots 313 on the sidewalls of connector 30 by wire-insertion tool 40.

Wall plate 100 is a generally planar structure whose dimensions are approximately 2¾×4½ inches. It is molded from a dielectric material such as Polyvinyl Chloride (PVC) and includes opening 15 for receiving jack 20 which is inserted from the back side thereof. During installation, jack 20 is pushed into opening 15 until stop members 21, 22 inhibit further advancement. Flexible member 23 includes a protrusion, such as wedge-shaped tab 24, for latching the jack into place. The shape of opening 15 in wall plate 100 corresponds to the shape of jack 20, and is sized to interact with the wedge-shaped tab 24 so that the jack will easily snap into the slots 12 and be retained therein by ledge 13. In this illustrative embodiment, ledge 13 is formed by an approximate ninety degree (90°) bend in the direction of slot 12. Tab 24 causes flexible member 23 to deflect into cavity 25 of jack 20 during installation and removal of the jack into and out of wall plate 100. Because the dimensions of the modular plug 50 are designed to mate with those of cavity 25, with suitable clearance, flexible member 23 is precluded from being deflected into the cavity when a modular plug is located therein. Therefore, wall plate 100 remains captured between stop members 21, 22 and wedge-shaped tab 24 of jack 20. It is noted that jack 20 is symmetrical and includes an additional flexible member having a tab as well as stop members positioned on its opposite side surface (not shown).

Tool 40 is designed to stay mechanically attached to connector 30 with or without wires positioned in the wire-receiving slots 313. It functions as a tool for inserting wires into a terminal strip, and as a tool for removing a jack frame from a wall plate. After the jack frame has been removed, the tool is conveniently stored, as indicated, on connector 30. During removal of the jack frame 20, tabs 42 are inserted into slots 12 of the wall plate 100 in order to interact with the jack retaining means, namely wedge-shaped tabs 24 which are positioned on flexible members 23. Note that the direction of tool insertion is the same as the direction required for removing the jack frame. Therefore, after tabs 42 are inserted into slots 12, pressing on tool 40 not only release the jack retaining means, but also pushes the jack frame through the wall plate. Prior art systems that require removal of the jack frame from the back side of the wall plate are cumbersome because wiring and/or other jack frames obstruct access to the jack retaining means. Accordingly, slots 12 in the wall plate provide access to the jack retaining means and thereby offer a distinct advantage over prior art wall plates.

Figure 3:
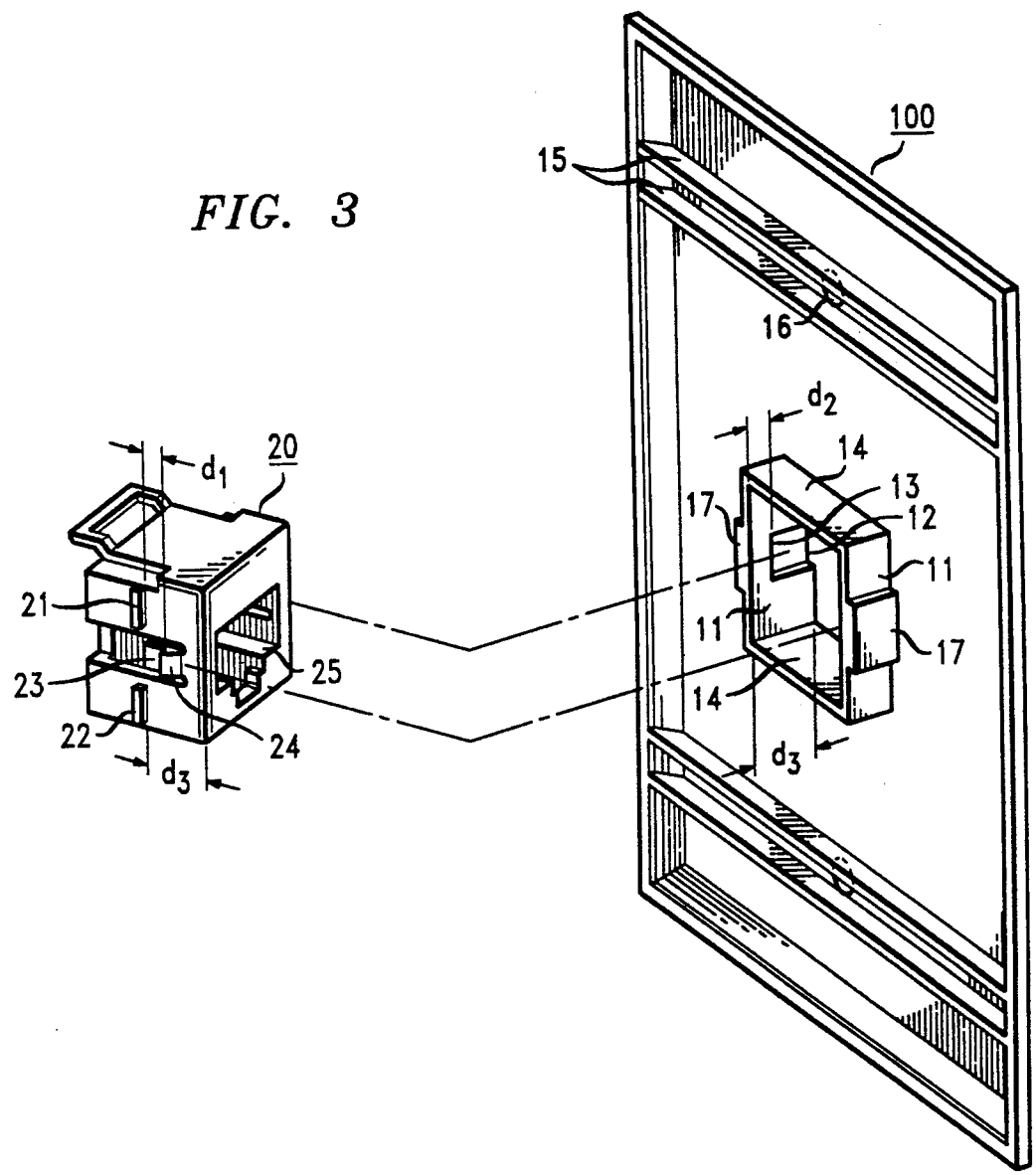
FIG. 3 is a rear perspective view of the wall plate showing certain relevant dimensions together with the corresponding dimensions of the associated modular jack.

FIG. 3 is a rear perspective view of the wall plate showing certain relevant dimensions together with the corresponding dimension of an associated jack. Jack 20 is molded from a dielectric material such as Polyvinyl Chloride (PVC), and includes flexible members 23 that each have a wedge-shaped tab 24 for easy insertion and latching. Each tab 24 has a front portion and a wider back portion that is directionally aligned with the front and back ends of the jack, which is to say that the front portion of the tab is near the front end of the jack while the back portion of the tab is near the back end of the jack. This facilitates the insertion of jack 20 into wall plate 100 but hinders its removal therefrom. The edges of the stop members 21, 22 reside in a first plane while the edge of tab 24 resides in a second plane. The first and second planes are separated by distance $d_1$ which is approximately 0.090 inches. Flexible member 23 has a thickness which provides sufficient rigidity and flexibility. For the PVC material used, a thickness of 0.040 inches is suitable. Finally, the distance between stop members 21, 22 and the front surface of the jack frame is designated $d_3$ corresponding to the distance between the back edge of sidewalls 11 and the front surface of the wall plate 10. In this example embodiment, $d_3=0.290$ inches. Note, however, that the distance between the back edge of sidewall 11 and ledge 13 is designated $d_2$ and is equal to 0.074 inches. This is somewhat less that the corresponding distance on the jack frame, $d_1$, which is designed to interlock the jack and wall plate. The difference between $d_1$ and $d_2$ provides sufficient clearance to allow the jack frame and wall plate to be easily interlocked together, notwithstanding manufacturing variations, with only a small amount of relative movement thereafter. Sidewalls 11 are part of a continuous collar that surrounds the opening in the wall plate. Walls 14 connect sidewalls 11 at the top and bottom and provide rigidity to the sidewalls. This is desirable because sidewall flexing might allow the jack to be pushed through the wall plate at inappropriate times, e.g., during insertion of a modular plug. Further strengthening the rigidity of the sidewalls 11 are support ribs 17 which are molded into the wall plate to increase the thickness of the sidewalls in the regions where slots 12 are positioned. Finally, the wall plate itself is strengthened in the region where screws are used to attach the wall plate to a wall surface. Ribs 15 are positioned above and below screw hole 16 to provide such strengthening.

Figure 4:
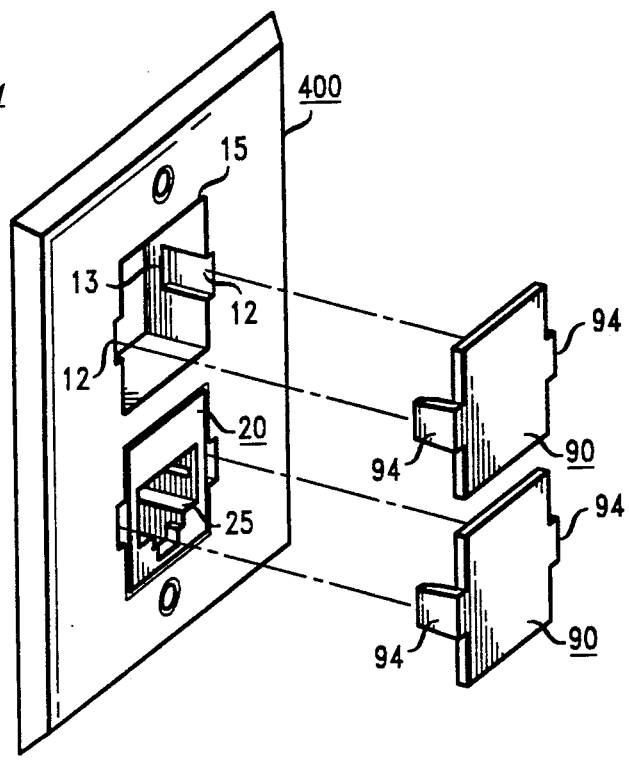
FIG. 4 illustrates two situations in which a dust cover is used with the wall plate of the present invention.

Referring now to FIG. 4, a wall plate 400 having a two openings is disclosed in order to illustrate another advantage that is achieved by locating jacks release slots on the front surface of the wall plate. The top opening 15 in wall plate 400 is shown without an electrical connector located therein. In order to provide a "finished" appearance and to prevent unwanted materials from entering the opening, dust cover 90 is designed to be inserted therein. Dust cover 90 comprises a generally square, planar object that includes pins 94 that are positioned on opposite side edges of the cover, and are perpendicular to the plane of the dust cover. Dust cover 90 and pins 94 are shaped to mate with opening 15 and slots 12, respectively, in wall plate 400. Pins 94 include a slight taper in their vertical dimension that enables the dust cover to be frictionally held within the opening. When the dust cover is fully inserted, its front surface is flush with the front surface of the wall plate, and the ends of pins 94 are pressing against ledge 13 within the slot. Because the dust cover is flush with the wall plate, it must be pushed from its back side to be removed. The bottom opening in wall plate 400 is shown with modular jack 20 already installed. Dust cover 90 may additionally be used to cover the jack itself so that plugs, or unwanted material, cannot be inserted into jack opening 25. However, the pins on dust cover 90 are neither thick enough nor long enough to release jack 20 when positioned on the jack.

Figure 5:
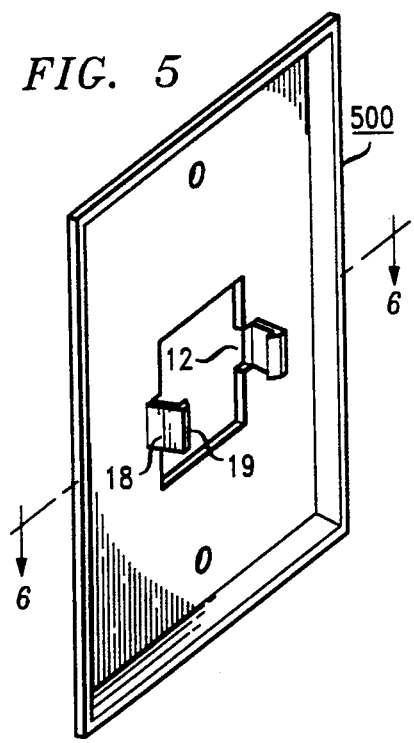
FIG. 5 disclosed a rear perspective view of a second embodiment of the wall plate made in accordance with the invention, in which a pair of flexible tabs for holding a modular jack are positioned on the wall plate.
Figure 6:
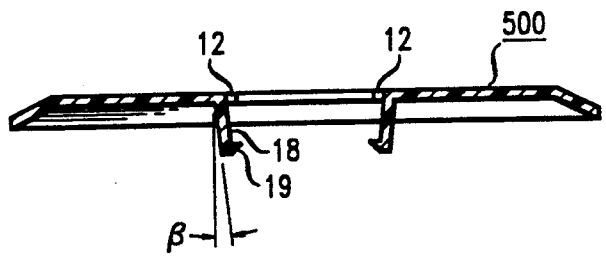
FIG. 6 discloses a cross sectional view of the wall plate, according to the invention, shown in FIG. 5.

A rear perspective view of a second embodiment of the invention is shown in FIG. 5 wherein flexible, cantilevered tabs 18, used for capturing a jack frame, are located on wall plate 500 itself rather than on the jack. As with other embodiments of the invention, slots 12 are available to allow interaction with the jack retaining means (i.e., tabs 18) from the front of the wall plate. Advantageously, removal of the jack from the wall plate 500 is facilitated. Hooks 19, located at the ends of tabs 18, cooperate with mating indentations on a jack frame to hold them together (see e.g., jack 830 in FIG. 8). A cross sectional view of wall plate 500 is disclosed in FIG. 6 to show that a slight angle, $\beta$, exists between tab 18 and a line that is perpendicular to the plane of the wall plate. Because each tab is immediately adjacent to a slot 12, and because the tabs are tapered slightly toward each other, a surface on each tab is exposed that faces the front of the wall plate. This provides a pair of contact surfaces for a jack-removing tool, pressed into slots 12, to interact with. When the tool is pressed forward it interacts with the exposed surfaces of the tab thereby spreading them and releasing the jack which is captured by hooks 19.

Although various particular embodiments of the invention have been shown and described, it is understood that various modifications are possible within the spirit and scope of the invention. These modifications include, but are not limited to, the use of a hole rather than a ledge within the slot to hold the jack and wall plate together, the use of communications outlets, other than modular jacks, on the wall plate; and positioning the slots, which allow interaction with jack-retaining means, at other locations on the front surface of the wall plate.

I claim:

1. A wall plate comprising a generally flat surface having an opening therein, extending between its front and back sides, for receiving a communications jack, the back side of the wall plate including means for retaining the jack and wall plate together, the wall plate further comprising a pair of slots that are positioned on opposite sides of the opening flush with its front surface and extend rearwardly to the jack retaining means; whereby access to the jack retaining means from the front surface of the wall plate allows a communications jack to be conveniently released.

2. The wall plate of claim 1 wherein the slots comprise grooves within a pair of sidewalls that are positioned on opposite sides of the opening, each groove extending from the front surface of the wall plate toward the back surface thereof.

3. The wall plate of claim 2 wherein each groove terminates in a ledge before reaching the back edge of the sidewall, each ledge substantially comprising a ninety degree bend in the direction of the groove.

4. The wall plate of claim 2 wherein the sidewalls are connected by top and bottom walls and, together, form a collar around the opening in the wall plate on its back side.

5. The wall plate of claim 1 wherein the jack retaining means comprises a pair of flexible, cantilevered tabs that are positioned on opposite sides of the opening in the wall plate on its back side, each of said tabs including a hook for mating with a complementary indentation on a jack to hold the jack and wall plate together.

6. The wall plate of claim 5 wherein the tabs are positioned immediately adjacent to the slots, and are tapered slightly toward each other, whereby a contact surface is exposed for a jack-removing tool to interact with when pressed into the slots.

7. A wall plate for flush-mounting a modular jack thereon, the wall plate including a first pair of sidewalls, positioned on opposite sides of an opening in the wall plate that receives the modular jack, the first pair of sidewalls being substantially perpendicular to a front surface of the wall plate and each including a narrow channel flush with the front surface of the wall plate and extending rearwardly toward the back surface thereof and terminate in a jack-holding means, the channel increasing the opening in the wall plate to provide access to the jack-holding means; whereby removal of the modular jack is facilitated.

8. The wall plate of claim 7 further including a second pair of sidewalls, positioned on opposite sides of the opening in the wall plate that receives the modular jack, the second pair of sidewalls being substantially perpendicular to the front surface of the wall plate and joined to ends of the first paid of sidewalls to form a collar around the opening; whereby improved support for the modular jack is achieved.

9. The wall plate of claim 7 wherein each of the first pair of sidewalls further includes a support rib, positioned behind the channel and increasing its thickness in the region of the channel.

10. In combination, a jack frame and a wall plate;

the jack frame having a plurality of surfaces including front, back, right side, and left side; the front surface including a plug-receiving cavity therein, each side surface including a cantilever flexible member having a protrusion that interlocks with a jack retaining means in the wall plate, each flexible member being adapted to deflect into the plug-receiving cavity during insertion and removal of the modular jack into and out of the wall plate respectively; and the wall plate comprising a generally flat surface having an opening therein that extends between its front and back sides and receives the jack frame, the back side of the wall plate including jack retaining means for cooperating with the protrusion in the flexible member of the jack frame to hold them together, the wall plate including a pair of slots that are positioned on opposite sides of the opening flush with its front surface and extend rearwardly to the jack retaining means.

* * * * *